United States Patent [19]

Katoh et al.

[11] Patent Number: 4,720,412
[45] Date of Patent: Jan. 19, 1988

[54] POLYESTER BASE FILM FOR MAGNETIC RECORDING MEDIA

[75] Inventors: Hideo Katoh, Kanagawa; Hiroshi Tomita, Sagamihara, both of Japan

[73] Assignee: Teijin Limited, Osaka, Japan

[21] Appl. No.: 851,146

[22] Filed: Apr. 11, 1986

[30] Foreign Application Priority Data

Apr. 17, 1985 [JP] Japan .................................. 60-80274

[51] Int. Cl.$^4$ .......................... G11B 5/70; B32B 3/30; B32B 27/00
[52] U.S. Cl. ..................................... 428/141; 428/480; 428/694; 428/900
[58] Field of Search ................. 428/480, 694, 900, 141

[56] References Cited

U.S. PATENT DOCUMENTS

| | | | |
|---|---|---|---|
| 4,539,260 | 9/1985 | Abe et al. | 428/900 |
| 4,578,729 | 3/1986 | Suzuki et al. | 428/900 |
| 4,615,939 | 10/1986 | Corsi et al. | 428/694 |

*Primary Examiner*—Paul J. Thibodeau
*Attorney, Agent, or Firm*—Wenderoth, Lind & Ponack

[57] ABSTRACT

A biaxially stretched polyester base film having many fine protrusions on its surface, characterized by having the following properties:

(a) in a distribution curve representing the relation between the number of protrusions ($y/mm^2$) and the height of protrusions (x in $\mu m$) on the surface of said film which are measured in a region having at least 20 protrusions/$mm^2$, that part of the distribution curve at which the protrusion height (x) is larger than its peak value crosses the line of $\log_{10} y = -18x + 3.7$, (b) when the number of protrusions (y) on the film surface is at least 20/$mm^2$, no protrusion exists which has a height (x) of at least 0.13 $\mu m$, (c) said film has a surface roughness (Ra) of not more than 0.012 $\mu m$, (d) said film has a Young's modulus in the longitudinal direction of at least 650 kg/$mm^2$, and (e) when heat-treated at 70° C. for 1 hour under no load, said film has a heat shrinkage in the longitudinal direction of not more than 0.1%.

12 Claims, 1 Drawing Figure

POLYESTER BASE FILM FOR MAGNETIC RECORDING MEDIA

This invention relates to a biaxially stretched polyester film suitable as a base film for a magnetic recording medium. More specifically, this invention relates to a biaxially stretched polyester film having a high Young's modulus and being useful as a base film for the production of a magnetic recording medium having excellent electromagnetic conversion characteristics.

Magnetic recording media having a polyester film as a base have found extensive use, for example in video tapes, audio tapes, computer tapes and floppy discs. In such applications, there has been an increasing demand for high density recording and small sizes, and accordingly, the polyester base film has been strongly required to have a flat surface, slipperiness, excellent handlability and a small thickness. In portable magnetic recording devices, typically a device having an 8 mm video tape, the tape is frequently exposed to high temperatures outdoors or inside of vehicles. Hence, the tape for use in such applications and a base film of the tape have been strongly required to have both dimensional stability and thermal stability.

Generally, when the base film is to be reduced in thickness, it is the usual practice to stretch it at a high ratio and thus increase its Young's modulus so that a tape prepared from it has durability. This, however, results in reduced dimensional stability. To avoid this problem, it has been the previous practice to remove the residual strain of the base film by heat-treating it at a high temperature under a low tension in the step of processing it into a tape. In such a heat-treatment, the quality of the film is difficult to control, and the tape forming step becomes complex.

It is a general object of this invention to overcome the aforesaid problem, and to develop a biaxially stretched polyester base film which has a high Young's modulus as well as flatness, dimensional stability and thermal stability and can be applied to the field of magnetic recording media of high quality.

A specific object of this invention is to provide a biaxially stretched polyester base film of high quality which is useful in magnetic recording media, particularly magnetic recording media for high-density recording such as a metal magnetic recording medium.

A more specific object of this invention is to provide a biaxially stretched polyester base film having many fine protrusions on its surface, which (1) has a flat surface with no large protrusions, (2) has sufficient strength to withstand thickness reduction of a magnetic recording medium, and (3) gives a magnetic recording medium having excellent dimensional stability.

Other objects of this invention along with its advantages will become apparent from the following detailed description.

BRIEF DESCRIPTION OF THE DRAWINGS

The FIGURE (FIG. 1) shows a distribution curve representing the relationship between the number of protrusions and the height of the protrusions on the surface of a film.

According to this invention, there is provided a biaxially stretched polyester base film having many fine protrusions on its surface, characterized by having the following properties:

Figure 1:
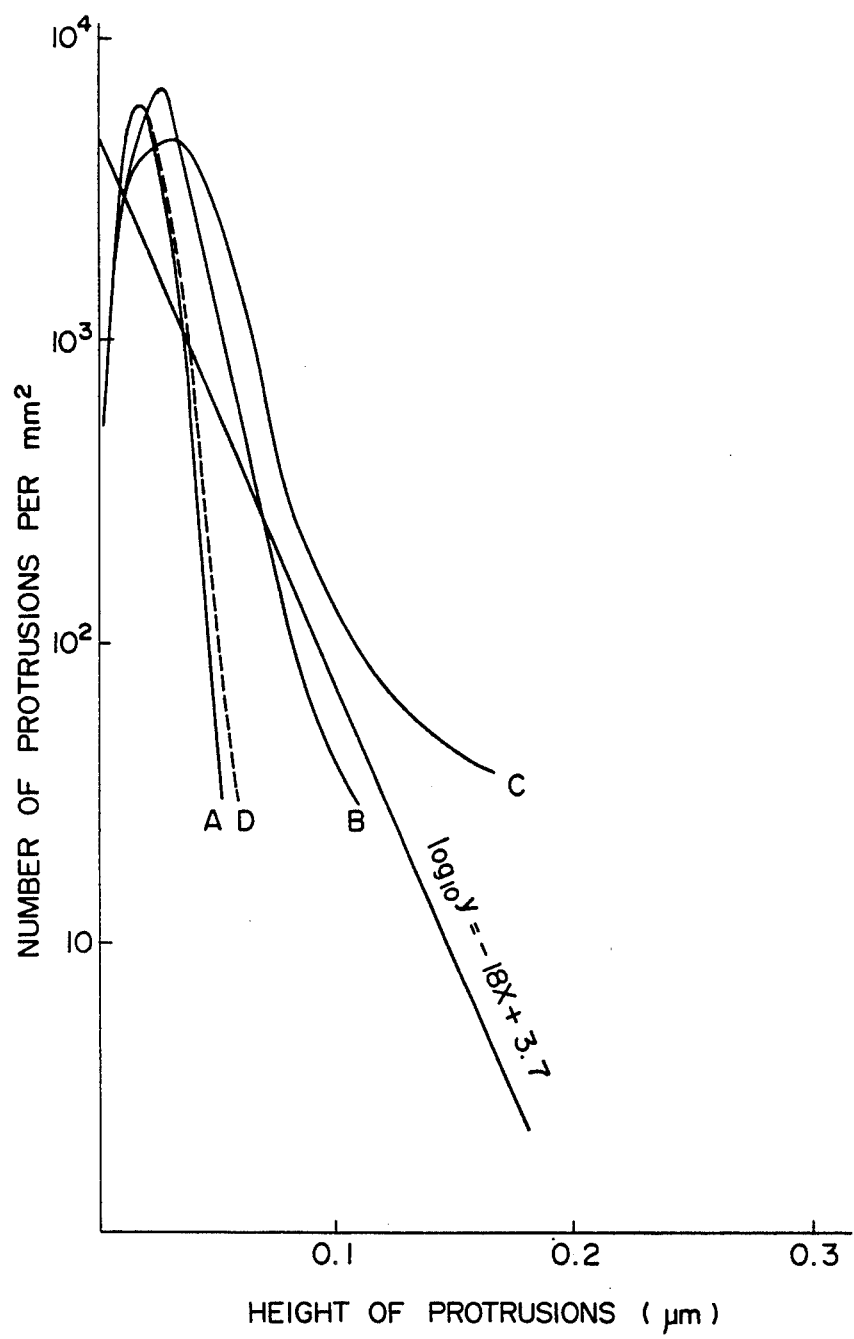

(a) in a distribution curve representing the relation between the number of protrusions ($y/mm^2$) and the height of protrusions (x in $\mu m$) on the surface of said film which are measured in a region having at least 20 protrusions/$mm^2$, that part of the distribution curve at which the protrusion height (x) is larger than its peak value crosses the line of $\log_{10} y = -18x + 3.7$, (b) when the number of protrusions (y) on the film surface is at least 20/$mm^2$, no protrusion exists which has a height (x) of at least 0.13 $\mu m$, (c) said film has a surface roughness (Ra) of not more than 0.012 $\mu m$, (d) said film has a Young's modulus in the longitudinal direction of at least 650 kg/$mm^2$, and (e) when heat-treated at 70° C. for 1 hour under no load, said film has a heat shrinkage in the longitudinal direction of not more than 0.1%.

The polyester base film of this invention is one which, to impart slipperiness thereto, has been surface-roughened (many fine protrusions are formed on its surface) under controlled conditions which minimize deleterious effects on the quality of a final magnetic recording medium to be produced by using the base film.

The biaxially stretched polyester base film of this invention contains many fine protrusions distributed throughout its surface, and has the following surface properties.

(a) In a distribute curve representing the relation between the number of protrusions ($y/mm^2$) and the height of protrusions (x in $\mu m$) on the film surface which are measured in a region having at least 20 protrusions/$mm^2$, that part of the distribution curve at which the protrusion height (x) is larger than its peak value crosses the line of $\log_{10} y = -18x + 3.7$.

(b) When the number of protrusions (y) on the film surface is at least 20/$mm^2$, no protrusion exists which has a height (x) of at least 0.13 $\mu m$.

(c) The film has a surface roughness (Ra) of not more than 0.012 $\mu m$.

It is critical for the film of this invention to have such a surface property that in a region where the number of protrusions (y) is at least 20/$mm^2$, the distribution of the number (y) of the protrusions and the height (x) of the protrusions satisfies the conditions shown in (a) above. If this condition is not satisfied and, for example, that part of the distribution curve at which the protrusion height (x) is larger than its peak value always satisfies the following expression (2)

$$\log_{10} y > -18x + 3.7 \qquad (2),$$

the surface of the film is excessively roughened, and there is a greater probability of existence of protrusions having a height of larger than 0.13 $\mu m$. Furthermore, the electromagnetic conversion characteristics of a magnetic recording medium produced from this film cannot retain properties required of a high quality metal magnetic recording tape. On the other hand, when the aforesaid part of the distribution curve always satisfies the following expression $$\log_{10} y < -18x + 3.7 \qquad (3),$$

the film surface becomes too flat, and its coefficient of friction becomes high (its slipperiness is reduced). Hence, the handlability of the film during base film formation or during production of a magnetic recording medium is poor, and troubles such as creasing are liable to occur.

Protrusions having too large a height should not be present on the surface of the film of this invention, and when the number (y) of protrusions is at least 20/mm$^2$, the height (x) of the protrusions should be less than 0.13 μm, preferably not more than 0.10 μm.

The "height (x) of protrusions" and the "number (y) of protrusions", are referred to in the present specification and claims, are obtained by the protrusion distribution measuring method described below.

The profiles of protrusions on the film surface are three-dimensionally imaged by using a three-dimensional roughness tester (SE-3CK, made by Kosaka Research Institute) under the following conditions.

Needle diameter: 2 μmR
Needle pressure: 30 mg
Measuring length: 1 mm
Sampling pitch: 2 μm
Cutoff: 0.25 mm
Magnification in the longitudinal direction: 20,000
Magnification in the transverse direction: 200
Scanning: 150 lines A plane of the profiles which is at right angle to the thickness direction of the film and in which the total of the cross sectional areas of the profiles of the protrusions is 70% of the area of a measuring region of the film is assumed to be a standard level (0 level). When the profiles are cut in a plane which is parallel to the plane of the standard level and apart from it by distance x in the height direction of the protrusions, the number of cut protrusions is designated as y. The value x is progressively increasing or decreasing x, and the corresponding y value is measured. The protrusion distribution curve can be drawn by plotting the varying x and y values in a graph.

These methods are described in the Instruction Manual of 3E-3CK, made by Kosaka Research Institute.

In the present specification and claims, the distance x is defined as the "height (x) of protrusions" and y, as the "number (y) of protrusions".

It is also critical that the film of this invention has a surface roughness (Ra) of not more than 0.012 μm, as shown in (c) above. If the surface roughness (Ra) of the polyester base film is larger than 0.012 μm, the surface of a magnetic recording layer to be applied to the base film cannot retain electromagnetic conversion characteristics required of a magnetic recording medium of high quality. The preferred surface roughness (Ra) is not more than 0.010 μm, especially 0.008 to 0.004 μm.

The "surface roughness (Ra) of the film", as used in the present specification and claims, is measured by the method described in JIS B0601 as follows:

By using a needle-contacting type surface roughness tester (SURFCOM 3B made by Tokyo Seimitsu Co., Ltd.), the surface roughness curve of a sample film is drawn on a chart under a load of 0.07 g with a cutoff of 0.25 mm using a needle with a radius of 2 microns. A part having a measured length of L is picked up from the surface roughness curve in a direction along the center line of the curve. Let the center line of the picked-up part be X-axis and the longitudinal direction, Y-axis, then the roughness curve is expressed by Y=f(x). The value Ra (in micrometers) given by the following equation is defined as the surface roughness of the film.

$$Ra = \frac{1}{L} \int_0^L |f(x)| dx$$

In the present invention, the measured length L is set at 2 mm, and the measurement is made through 8 replicates. The three largest values are excluded, and Ra is obtained as an average of the remaining five measured values.

The biaxially stretched polyester film of this invention has the following physical properties in addition to the surface properties described above.

(d) It has a Young's modulus in the longitudinal direction of at least 650 kg/mm$^2$.

(e) It has a heat shrinkage in the longitudinal direction of not more than 0.1% when heat-treated at 70° C. for 1 hour under no load.

In recent years, magnetic recording media have increasingly been required to permit long time recording (or high density recording) and be reduced in size, and accordingly, polyester base films having a smaller thickness and a higher Young's modulus have been desired. The reason for higher Young's moduli is that a thinner film has lower stiffness. Thus, unless the film has a higher Young's modulus, a tape, for example, prepared from it encounters troubles in a tape travelling system and cannot withstand repeated running. In the case of a video tape, its contact with a rotating cylinder head is not sufficient so that the electromagnetic conversion characteristics of the tape will be deteriorated.

From this standpoint, it has been found in accordance with this invention that a polyester film having a Young's modulus in the longitudinal direction of at least 650 kg/mm$^2$, preferably at least 700 kg/mm$^2$, especially preferably at least 750 kg/mm$^2$, is very suitable as a base film of electromagnetic recording media. The "longitudinal direction", as used herein, means the longitudinal direction of the film. The suitable Young's modulus of the film in the transverse direction is at least 400 kg/mm$^2$, preferably at least 450 kg/mm$^2$.

To impart a high Young's modulus to a film, it is necessary to stretch the film longitudinally at a high stretch ratio of, for example, at least 4.2. Such a high stretch ratio usually results in a high residual strain in the film and a high heat shrinkage of the film in the longitudinal direction. It has been found that consequently, the dimensional stability of the film is reduced, and that the skew of a magnetic tape prepared from the film exceeds 10 μsec so that when the tape is a video tape, a twisted image will appear on the display depending upon a television receiver and spoil the valuable records. It has been found in accordance with this invention however that if the polyester film has a heat shrinkage in the longitudinal direction of not more than 0.1%, preferably not more than 0.06%, more preferably not more than 0.03% when heat-treated at 70° C. for 1 hour under no load, the film has no such defect, and is feasible as a base film for magnetic recording media of high quality.

The polyester film having a high Young's modulus and a heat shrinkage in the above-specified range may be obtained by heating the stretched film under no tension or under a low tension and relaxing it in the longitudinal direction.

The biaxially stretched polyester base film of this invention having the aforesaid surface properties and physical properties can be produced by melt-molding a polyester containing substantially inert solid fine particles dispersed therein into a film, biaxially stretching the film, and subjecting the stretched film to a longitudinal relaxation treatment.

An aromatic polyester, i.e. a linear saturated polyester synthesized from an aromatic dibasic acid or its ester-forming derivative and a diol or its ester-forming derivative, is suitable as the polyester used in the production of the film of this invention. Specific examples of the aromatic polyester are polyethylene terephthalate, polyethylene isophthalate, polybutylene terephthalate, poly(1,4-cyclohexylene dimethylene terephthalate), and polyethylene-2,6-naphthalene dicarboxylate, co-polymers thereof, and blends of these with a minor proportion of other resins. Polyesters having ethylene terephthalate units as main recurring units are especially suitable. They may contain less than 20 mole% of other structural components copolymerizable with the ethylene terephthalate units, such as dicarboxylic acids, glycols, and hydroxycarboxylic acids. These polyesters can be produced by methods known per se.

There is no limitation on the inert solid fine particles to be included in the polyester, and they may be any solid fine particles which do not exert substantially deleterious effects on the physical and chemical properties of the polyester when dispersed in it. Examples of such inert solid fine particles which are preferably used in this invention include (1) silicon dioxide (including its hydrate, diatomaceous earth, silica sand and quartz); (2) alumina; (3) silicates containing at least 30% by weight of $SiO_2$ [for example, amorphous or crystalline clay minerals, aluminosilicates (including calcined products or hydrates), chrysotile, zirconium, flyash, etc.]; (4) oxides of metals such as Mg, Zn, Zr and Ti; (5) sulfates of Ca and Ba; (6) phosphates of Li, Na and Ca (including monohydrogen salts or dihydrogen salts); (7) benzoates of Li, Na and K; (8) terephthalates of Ca, Ba, Zn and Mn, (9) titanates of Mg, Ca, Ba, Zn, Cd, Pb, Sr, Mn, Fe, Co and Ni; (10) chromates of Ba and Pb; (11) carbon (such as carbon black and graphite); (12) glass (glass powder and glass beads); (13) carbonates of Ca and Mg; (14) fluorspar; and (15) ZnS. Examples of preferred inert fine particles include silicic anhydride, hydrous silicic acid, aluminum oxide, aluminum silicate (including its calcined product and hydrate), monolithium phosphate, trilithium phosphate, sodium phosphate, calcium phosphate, barium sulfate, titanium dioxide, lithium benzoate, double salts (containing hydrates) of these compounds, glass powder, clays (including kaolin, bentonite and terra alba), talc, diatomaceous earth and calcium carbonate. Silicon dioxide, titanium dioxide and calcium carbonate are especially preferred. The inert solid fine particles preferably have an average particle diameter of 0.05 to 0.6 micrometer, especially 0.08 to 0.4 micrometer. The amount of the inert solid fine particles to be incorporated in the polyester is generally 0.01 to 1.5% by weight, preferably 0.03 to 1.0% by weight, especially preferably 0.05 to 0.6% by weight, based on the weight of the polyester.

The polyester having the inert solid fine particles dispersed therein can be produced, for example, by adding the inert solid fine particles (preferably as a slurry in a glycol) to the reaction system during the reaction of forming the polyester, for example, at any desired time during ester-interchange reaction, polycondensation reaction, or direct polymerization. Preferably, the inert solid solid particles are added to the reaction system in the early stage of the polycondensation reaction, for example before the intrinsic viscosity of the polyester reaches about 0.3.

The resulting polyester containing the inert solid fine particles dispersed therein is molded in the molten state into a film by a method known per se and biaxially stretched. The stretching may also be carried out by a method known per se. The stretch ratio to be used at this time is selected so that the Young's modulus of the resulting biaxially stretched film in the longitudinal direction is within the above-specified range. Generally, the film is stretched at a temperature of 70° to 150° C. to 4.1 to 5.5 times, preferably 4.6 to 5.5 times, in the longitudinal direction and to 3.0 to 3.8 times, preferably 3.2 to 3.5 times, in the transverse direction. The biaxially oriented film is usually heat-set at a temperature of 180° to 235° C., preferably 200° to 225° C.

The biaxially stretched film is then subjected to a relaxation treatment in the longitudinal direction under heat so that its heat shrinkage in the longitudinal direction is within the above-specified range. The relaxation treatment may be effected, for example, by a method comprising heating the film under a low tension without contact while the film is caused to float by the pneumatic force under a low tension; a method comprising providing a velocity difference between a heating roll and a cooling roll each having a nip roll and passing the film between them, or a method comprising relaxing the film longitudinally by gradually slackening the advancing speed of a clip holding the film in a tenter. The method of relaxation, however, is not particularly limited, and any other feasible methods may be employed.

The relaxation treatment conditions depend upon the conditions used in the biaxial stretching in the previous step. Generally, the temperature at which the longitudinal relaxation treatment is carried out is between $(Tg+20)°C$. and (heat-treatment temperature $-30)°C$., preferably between $(Tg+30)°C$. and (heat-treatment temperature $-40)°C$. If the relaxation temperature is lower than $(Tg+20)°C$., the heat shrinkage of the film near Tg cannot be fully decreased. If it is higher than (heat-treatment temperature $-30)°C$., the amount of longitudinal relaxation increases but thickness non-uniformity increases. Furthermore, when the relaxation is carried out by providing a velocity difference between two rolls, scratches undesirably occur in the transverse direction on the film surface owing to the widthwise shrinking of the film on the heating roll. The amount of longitudinal relaxation differs also depending upon the heat-treatment temperature. For example, in the case of performing relaxation by the velocity difference between two rolls, the speed of the cooling roll is preferably adjusted with respect to the heating roll so that the tension of the film at the time of relaxation becomes 10 kg/cm$^2$ to 80 kg/cm$^2$. If the tension of the film is less than 10 kg/cm$^2$, the film becomes loose and creases occur. If the tension exceeds 80 kg/cm$^2$, the heat shrinkage of the film cannot be sufficiently reduced.

The time required for longitudinal relaxation is usually at least 0.1 sec after the film has attained a predetermined temperature.

Within the above-described conditions, any one skilled in the art would be able to determine easily by routine experiments the optimum conditions which give longitudinal heat shrinkages within the above-specified range.

The polyester film of this invention generally has a thickness of 5 to 15 micrometers and contains many fine protrusions on its surface. It, however, has no large protrusions, and moreover has a high Young's modulus and excellent dimensional stability. Hence, it is very superior as a base film for magnetic recording media of high quality.

In the production of a magnetic recording medium, a magnetic recording layer may be formed on the base film of this invention by, for example, kneading a magnetic powder such as ferromagnetic iron oxide (e.g., $\gamma\text{-Fe}_2\text{O}_3$ or Co-containing $\gamma\text{-Fe}_2\text{O}_3$), or a ferromagnetic metal powder (e.g. pure Fe and an iron alloy such as Fe-Ni or Fe-Ni-Co) with a binder to form a magnetic coating composition, and coating the magnetic coating composition on the base film (nonmagnetic support). The base film of this invention is particularly suitable for use in metal tapes of high quality containing a ferromagnetic metal powder.

The following examples illustrate the present invention in greater detail. The various properties and characteristics in the present invention are measured by the following methods. All parts in the following are by weight.

(1) Young's modulus

A film sample, 10 mm wide and 15 cm long, was stretched by an Instron universal tensile tester with an interchuck distance of 100 mm at a stretching speed of 10 mm/min. and a chart speed of 500 mm/min. The Young's modulus of the sample was calculated from a tangent to the rising part of the resulting load-elongation curve.

(2) Skew

A video tape recorded at 20° C. and at a normal humidity was heat-treated at 70° C. for 1 hour, and then played back at 20° C. and at a normal humidity. The amount of skew at the head switching point was read.

(3) Electromagnetic conversion characteristics of a magnetic coated film $\alpha\text{-Fe}_2\text{O}_3$ obtained by thermally decomposing acicular $\alpha$-FeOOH containing 5% of cobalt was reduced with hydrogen to obtain a black ferromagnetic metal powder which had a specific surface area, measured by the BET method using $N_2$ gas adsorption, of 40 m²/g.

One hundred parts of the ferromagnetic metal powder was kneaded with the following ingredients in a ball mill for 12 hours.

| | |
|---|---|
| Vinyl chloride/vinyl acetate copolymer containing maleic acid (degree of polymerization about 400; vinyl chloride/vinyl acetate/maleic acid = 86:13:1) | 20 parts |
| Polyester-type polyurethane (the reaction product of ethylene adipate and 2,4-tolylene diisocyanate; weight average molecular weight calculated for polystyrene about 110,000) | 13 parts |
| α-Alumina (average particle diameter 0.06 micrometer) | 5 parts |
| Carbon black (average particle diameter 0.05 micrometer) | 70 parts |
| Methyl ethyl ketone | 30 parts |
| Cyclohexanone | 100 parts |

After the kneading, 1 part of oleic acid, 1 part of palmitic acid and 1 part of amyl stearate were added and the mixture was kneaded further for 15 to 30 minutes. Subsequently, 7 parts of a 75% ethyl acetate solution of a triisocyanate compound was added, and all the ingredients were dispersed under a high speed shear for 1 hour to prepare a magnetic coating composition.

The magnetic coating composition was coated on a polyester film having a thickness of 10.0 micrometers to a dry thickness of 3.0 micrometers. The coated film was then subjected to an orientation treatment in a dc magnetic field, and dried at 100° C. After drying, the magnetic film was calendered and slit to a width of ½ inch to obtain a magnetic video tape.

By using a VSH-type VTR ("HR 7300", a tradename for a product Japan Victor Co., Ltd.) whose recording and playback head was made by "Sendust" alloy, the playback output of the video tape was measured. A commercial $\gamma\text{-Fe}_2\text{O}_3$ layer-coated ½' tape for VHS was used as a standard tape. The CN ratio of the video tape was determined by recording a carrier signal of 4 MHz, and using the level at 3.0 MHz of the reproduced amplitude modulation signal as a noise level.

EXAMPLE 1

Ten parts of silica (average particle diameter 0.15 micrometers) was added to 90 parts of ethylene glycol (EG for short), and they were mixed with stirring to form a slurry.

One hundred parts of dimethyl terephthalate and 70 parts of EG were subjected to ester-interchange in a customary manner in the presence of 0.035 part of manganese acetate tetrahydrate as a catalyst, and thereafter the silica slurry obtained as above (concentration of silica 0.2% by weight based on the polymer) was added with stirring. Subsequently, 0.03 part of trimethyl phosphate and 0.03 part of antimony trioxide were added, and polycondensation reaction was carried out at a high temperature under vacuum in a customary manner to give polyethylene terephthalate pellets having an intrinsic viscosity of 0.620. The polyethylene terephthalate (PET for short) pellets were dried at 170° C. for 3 hours, fed into a hopper of an extruder, and melted at 280° to 300° C. The molten polymer was extruded onto a rotating cooled drum having a surface finish of about 0.3S and a surface temperature of 20° C. through a slit-like die (1 mm) to form an unstretched film having a thickness of 160 micrometers.

The unstretched film was stretched longitudinally to 5.2 times at 70° C., and then stretched transversely to 3.0 times at 90° C. The biaxially oriented film was heat-treated at 215° C. for 5 seconds, and then subjected to a longitudinal relaxation treatment at 120° C. under a tension of 30 kg/cm² (of the cross-sectional area of the film). The resulting film had a thickness of 10 micrometers.

The same magnetic coating composition as described above was coated on the resulting film, and the resulting magnetic tape was evaluated. The results are shown in Table 1.

The distribution of the heights of protrusions and the number of protrusions on the film surface was as shown in curve A of FIG. 1. It contained no large protrusion. It had excellent electromagnetic conversion characteristics shown by a CN ratio of at least +6 dB. Furthermore, it had low skew, and the running of the tape was stable.

EXAMPLE 2

Example 1 was repeated except that 0.3% by weight of titanium dioxide (average particle diameter 0.4 micrometer) was added instead of the silica in the production of the base film.

The properties of the film are shown in Table 1, and the protrusion distribution curve of the film surface is shown as curve B in FIG. 1. The film surface was coarser than in the film of Example 1, but the resulting magnetic tape had satisfactory electromagnetic conversion characteristics and skew.

COMPARATIVE EXAMPLE 1

Example 1 was repeated except that 0.2% by weight of silica having an average particle diameter of 0.7 micrometer was added instead of the silica having an average particle diameter of 0.15 micrometer in the production of the base film in Example 1. The results are shown in Table 1.

The protrusion distribution curve of the film surface is shown as curve C in FIG. 1.

The resulting film had a roughened surface, and contained 60 protrusions having a protruding height of 0.13 micrometer per mm$^2$. As a result, the CN ratio of the magnetic tape was low.

EXAMPLES 3-4 AND COMPARATIVE EXAMPLES 2-3

The same unstretched film as obtained in Example 1 was stretched at each of the stretch ratios shown in Table 1. Since the heat shrinkage of the film after heat-treatment at 70° C. for 1 hour differs depending upon the longitudinal stretch ratio, the tension was changed as shown in Table 1 during longitudinal relaxation so as to adjust the heat shrinkage in the longitudinal direction of the final base film after heat-treatment at 70° C. for 1 hour to about 0.03%.

The protrusion distribution curve of the film obtained in Comparative Example 3 is shown as curve D in FIG. 1. The distribution curve of the films of Examples 3 and 4 and Comparative Example 2 were positioned between the curve A and the curve D, and therefore are omitted in FIG. 1.

The films obtained in these examples were as flat as the film of Example 1 with no high protrusion. But with decreasing Young's modulus in the longitudinal direction, the electromagnetic conversion characteristics of the magnetic tapes were deteriorated and their outputs and travelling properties became unstable. These results show that the film should have a Young's modulus in the longitudinal direction of at least 650 kg/mm$^2$.

EXAMPLES 5-6 AND COMPARATIVE EXAMPLES 4-5

Example 1 was repeated except that the heat shrinkage in the longitudinal direction of the base film after treatment at 70° C. for 1 hour was changed by changing the longitudinal relaxation conditions. In Comparative Example 5, no relaxation treatment was carried out.

The surface properties and Young's moduli of the films were the same as the film of Example 1 and their electromagnetic conversion characteristics were good. As the heat shrinkages in the longitudinal direction of the films after treatment at 70° C. for 1 hour became higher, the skews of the magnetic tapes became greater. These results show that there is a very good correlation between the heat shrinkage in the longitudinal direction of the base film after treatment at 70° C. for 1 hour and the skew characteristics of the magnetic tape. Specifically, when the heat shrinkage under the above-specified conditions is not more than 0.10%, the skew of the magnetic tape is not more than 10 μsec, and hardly any detwisted image appears on a television monitor. But when the heat shrinkage is at least 0.12%, the skew increases and a twisted image appears upon playback.

EXAMPLE 7

Using the same polyethylene terephthalate pellets as used in Example 1, an unstretched film having a thickness of 210 micrometers was prepared in the same way as in Example 1.

Subsequently, the unstretched film was stretched to 3.4 times in the longitudinal direction at 80° C. between two rolls having a velocity difference, and then stretched transversely to 4.0 times at 90° C. by the tenter method. The film was again stretched longitudinally to 1.6 times at 110° C. between two rolls having a velocity difference. The stretched film was heat-treated for 5 seconds in an oven kept at 215° C. while its both ends were grasped. The heat-treated film was then wound up.

Then, the heat-treated biaxially oriented polyester film was subjected to a longitudinal relaxation treatment at a temperature of 120° C. under a tension of 30 kg/cm$^2$ (of the cross-section of the film) to obtain a final polyester film having a thickness of 10 micrometers.

The same magnetic coating composition as described above was coated on the film, and the resulting magnetic tape was evaluated as above. The results are shown in Table 1.

The protrusion distribution of the film surface is shown in FIG. 1 as curve A. The magnetic tape had no large protrusions on its surface. Its CN ratio was as good as more than +6.0 dB. Furthermore, it had low skew and its running was stable.

TABLE 1

| | Item | Ex. 1 | Ex. 2 | CEx. 1 | Ex. 3 | Ex. 4 | CEx. 2 |
|---|---|---|---|---|---|---|---|
| Particles added | Kind | SiO$_2$ | TiO$_2$ | SiO$_2$ | " | " | " |
| | Average particle diameter (μm) | 0.15 | 0.4 | 0.7 | 0.15 | " | " |
| | Amount (wt. %) | 0.2 | 0.3 | 0.2 | 0.2 | " | " |
| Film-forming conditions | Longitudinal stretching temperature (°C.) | 70 | " | " | " | " | " |
| | Longitudinal stretching ratio | 5.2 | " | " | 4.7 | 4.2 | 3.9 |
| | Transverse stretching temperature (°C.) | 90 | " | " | " | " | " |
| | Transverse stretching ratio | 3.0 | " | " | 3.2 | 3.5 | " |
| | Heat-treatment temperature (°C.) | 215 | " | " | " | " | " |
| | Longitudinal relaxing temperature (°C.) | 120 | " | " | " | " | " |
| | Longitudinal relaxing tension (kg/cm$^2$ of the film cross-section) | 30 | " | " | 35 | 40 | 45 |
| Preparation of the film | Surface roughness Ra (μm) | 0.008 | 0.012 | 0.014 | 0.008 | 0.009 | 0.009 |
| | Longitudinal Young's modulus (kg/mm$^2$) | 780 | 780 | 780 | 705 | 655 | 600 |
| | Heat-shrinkage (%) after treatment at 70° C. for 1 hour | 0.03 | 0.03 | 0.02 | 0.03 | 0.02 | 0.03 |
| | Protrusion distribution curve (FIG. 1) | Curve A | Curve B | Curve C | — | — | — |
| Evaluation of the | Video output (dB) at 4 MHZ | +9.0 | +8.0 | +5.5 | +9.5 | +8.5 | +7.5 |
| | CN ratio (db) | +8.0 | +6.5 | +4.0 | +8.0 | +7.0 | +6.0* |

TABLE 1-continued

| | | | | | | | |
|---|---|---|---|---|---|---|---|
| magnetic tape | Skew (μsec) | 5 | 5 | 4 | 4 | 4 | 6 |

| | Item | CEx. 3 | Ex. 5 | Ex. 6 | CEx. 4 | CEx. 5 | Ex. 7 |
|---|---|---|---|---|---|---|---|
| Particles added | Kind | SiO₂ | " | " | " | " | " |
| | Average particle diameter (μm) | 0.15 | " | " | " | " | " |
| | Amount (wt. %) | 0.2 | " | " | " | " | " |
| Film-forming conditions | Longitudinal stretching temperature (°C.) | 70 | " | " | " | " | 80–100 |
| | Longitudinal stretching ratio | 3.5 | 5.2 | " | " | " | 3.4 × 1.6 (= 5.4) |
| | Transverse stretching temperature (°C.) | 90 | " | " | " | " | 3.4 × 1.6 (= 5.4) |
| | Transverse stretching ratio | 3.5 | 3.0 | " | " | " | 3.8 |
| | Heat-treatment temperature (°C.) | 215 | " | " | " | " | " |
| | Longitudinal relaxing temperature (°C.) | 120 | " | " | " | — | 120 |
| | Longitudinal relaxing tension (kg/cm² of the film cross-section) | 50 | " | 70 | 100 | — | 30 |
| Preparation of the film | Surface roughness Ra (μm) | 0.009 | 0.008 | 0.008 | 0.008 | 0.008 | 0.008 |
| | Longitudinal Young's modulus (kg/mm²) | 550 | 785 | 790 | 790 | 800 | 820 |
| | Heat-shrinkage (%) after treatment at 70° C. for 1 hour | 0.02 | 0.06 | 0.10 | 0.12 | 0.20 | 0.03 |
| | Protrusion distribution curve (FIG. 1) | Curve D | Curve A | " | " | " | " |
| Evaluation of the magnetic tape | Video output (dB) at 4 MHZ | +7.0 | +9.5 | +9.5 | +9.0 | +9.0 | +9.5 |
| | CN ratio (db) | +6.0* | +8.5 | +8.0 | +7.5 | +8.0 | +8.5 |
| | Skew (μsec) | 7 | 8 | 10 | 14 | 23 | 4 |

(1) Ex. = Example; CEx. = Comparative Example
(2) The amount of the solid fine particles was based on the weight of the polymer.

What is claimed is:

1. A biaxially stretched, single-layer polyester base film containing inert solid fine particles dispersed therein and having may fine protrusions on its surface, said film having the following properties:
   (a) in a distribution curve representing the relation between the number of protrusions (y/mm²) and the height of protrusions (x in μm) on the surface of said film which are measured in a region having at least 20 protrusions/mm², that part of the distribution curve at which the protrusion height (x) is larger than its peak value of the distribution curve crosses the line of $\log_{10} y = -18x + 3.7$,
   (b) when the number of protrusions (y) on the film surface is at least 20/mm², no protrusion exists which has a height (x) of at least 0.13 μm,
   (c) said film has a surface roughness (Ra) of not more than 0.012 μm,
   (d) said film has a Young's modulus in the longitudinal direction of at least 650 kg/mm², and
   (e) when heat-treated at 70° C. for 1 hour under no load, said film has a heat shrinkage in the longitudinal direction of not more than 0.1%.

2. The film of claim 1 wherein when the number of protrusions, y, is at least 20/mm², the film does not contain protrusions having a height (x) of at least 0.10 micrometer.

3. The film of claim 1 which has a surface roughenss (Ra) of not more than 0.010 micrometer.

4. The film of claim 3 which has a surface roughness (Ra) of 0.004 to 0.008 micrometer.

5. The film of claim 3 which has a Young's modulus in the longitudinal direction of at least 700 kg/mm².

6. The film of claim 5 which has a Young's modulus in the longitudinal direction of at least 750 kg/mm².

7. The film of claim 1 which has a heat shrinkage in the longitudinal direction of not more than 0.06%.

8. The film of claim 7 which has a heat shrinkage in the longitudinal direction of not more than 0.03%.

9. The film of claim 7 which has been stretched to 4.1 to 5.5 times in the longitudinal direction and to 3.0 to 3.8 times in the transverse direction.

10. The film of claim 1 wherein the polyester is polyethylene terephthalate.

11. The film of claim 1 wherein the inert solid fine particles are fine particles of silicon dioxide, titanium dioxide or calcium carbonate.

12. The film of claim 1 which has a magnetic recording layer on its surface.

* * * * *